(12) United States Patent  
Marvin et al.

(10) Patent No.: US 8,970,152 B2
(45) Date of Patent: Mar. 3, 2015

(54) ELEVATOR MOTOR POWER SUPPLY CONTROL

(75) Inventors: Daryl J. Marvin, Farmington, CT (US); Michael Mann, Berlin (DE); Steven M. Millett, Plainville, CT (US)

(73) Assignee: Otis Elevator Company, Farmington, CT (US)

( * ) Notice: Subject to any disclaimer, the term of this patent is extended or adjusted under 35 U.S.C. 154(b) by 134 days.

(21) Appl. No.: 13/808,919

(22) PCT Filed: Jul. 30, 2010

(86) PCT No.: PCT/US2010/043868
§ 371 (c)(1),
(2), (4) Date: Jan. 8, 2013

(87) PCT Pub. No.: WO2012/015423
PCT Pub. Date: Feb. 2, 2012

(65) Prior Publication Data
US 2013/0119910 A1    May 16, 2013

(51) Int. Cl.
*B66B 1/30* (2006.01)
*H02P 27/00* (2006.01)

(52) U.S. Cl.
USPC ............. 318/434; 318/432; 318/504; 318/85; 187/296; 187/297

(58) Field of Classification Search
USPC ......... 318/434, 430, 432, 609, 610, 114, 504; 318/85; 363/37, 87; 307/31; 187/296, 297
See application file for complete search history.

(56) References Cited

U.S. PATENT DOCUMENTS

| 5,070,290 | A | | 12/1991 | Iwasa et al. | |
|---|---|---|---|---|---|
| 5,130,617 | A | | 7/1992 | Oshima et al. | |
| 5,491,624 | A | * | 2/1996 | Levran et al. | 363/87 |
| 5,549,179 | A | | 8/1996 | Herkel et al. | |
| 5,982,645 | A | * | 11/1999 | Levran et al. | 363/37 |

(Continued)

FOREIGN PATENT DOCUMENTS

| EP | 1444770 B1 | 10/2008 |
|---|---|---|
| JP | H0349567 A | 3/1991 |

(Continued)

OTHER PUBLICATIONS

International Preliminary Report on Patentability for International Application No. PCT/US2010/043868 dated Feb. 14, 2013.

(Continued)

*Primary Examiner* — Paul Ip
(74) *Attorney, Agent, or Firm* — Carlson, Gaskey & Olds

(57) ABSTRACT

An exemplary power supply assembly includes a drive device having a bus capacitor. A switch associated with an input side of the drive device selectively connects the drive device to a power supply. An inductor has an impedance that limits an amount of current supplied to the bus capacitor during an initial charging of the bus capacitor when the switch connects the input side of the drive device to the power supply. A restrictive circuit portion dampens a resonance effect of the inductor. The restrictive circuit portion has a resistance that allows the bus capacitor to charge quickly. The impedance of the inductor has a more significant effect on how quickly the bus capacitor charges than an effect of the resistance. A dampening factor of the restrictive circuit controls a voltage of the bus capacitor during the charging of the bus capacitor.

22 Claims, 2 Drawing Sheets

(56) References Cited

U.S. PATENT DOCUMENTS

| | | |
|---|---|---|
| 6,056,088 A | 5/2000 | Gerstenkorn |
| 6,173,814 B1 | 1/2001 | Herkel et al. |
| 6,422,350 B1 | 7/2002 | Erker |
| 6,481,533 B1 | 11/2002 | Iwasa |
| 7,331,426 B2 | 2/2008 | Jahkonen |
| 2002/0093264 A1* | 7/2002 | Raith et al. ............... 310/179 |
| 2002/0113562 A1* | 8/2002 | Raith et al. ............... 318/114 |
| 2002/0117913 A1* | 8/2002 | Raith et al. ............... 310/68 R |
| 2004/0095784 A1* | 5/2004 | Zhou ............... 363/37 |
| 2005/0168897 A1* | 8/2005 | Komulainen ............... 361/85 |
| 2010/0078998 A1* | 4/2010 | Wei et al. ............... 307/31 |

FOREIGN PATENT DOCUMENTS

| | | |
|---|---|---|
| JP | H0819265 A | 1/1996 |
| JP | H1175363 A | 3/1999 |
| JP | 2005170539 A | 6/2005 |
| WO | 2009056666 A1 | 5/2009 |

OTHER PUBLICATIONS

International Search Report and Written Opinion of the International Searching Authority for International application No. PCT/US2010/043868 dated Apr. 22, 2011.

* cited by examiner

ELEVATOR MOTOR POWER SUPPLY CONTROL

BACKGROUND

Elevator systems include various control features. One such feature required by elevator codes is that power cannot be supplied to the motor used to propel the elevator car whenever a hoistway door is not properly closed. Typical elevator systems include hoistway door lock switches that provide an indication when a corresponding hoistway door is not locked. There are other conditions in which power to the motor must be interrupted to satisfy current code requirements. Whenever such a condition exists, the connection between an elevator drive and the motor is interrupted by opening switch contacts at that location. The switch contacts disconnect the motor from the elevator drive so that the motor cannot receive power from the drive.

One drawback associated with that approach is that it requires a relatively expensive set of contacts between the drive and the motor. Additionally the switch contacts require periodic inspection and maintenance, which introduces additional cost. The switch contacts must be able to disconnect the motor from the drive when one of the doors is opened or another safety device provides an indication that the motor should not be powered. Another feature of typical switch contacts between the drive and the motor is that they are tested to confirm functionality before and after each elevator run.

SUMMARY

An exemplary power supply assembly includes a drive device having a bus capacitor. A switch associated with an input side of the drive device selectively connects the drive device to a power supply. An inductor has an impedance that limits an amount of current supplied to the bus capacitor during an initial charging of the bus capacitor when the switch connects the input side of the drive device to the power supply. A restrictive circuit portion dampens a resonance effect of the inductor. The restrictive circuit portion has a resistance that allows the bus capacitor to charge quickly. The impedance of the inductor has a more significant effect on how quickly the bus capacitor charges than an effect of the resistance. A dampening factor of the restrictive circuit controls a voltage of the bus capacitor during the charging of the bus capacitor.

The various features and advantages of disclosed example embodiments will become apparent to those skilled in the art from the following detailed description. The drawings that accompany the detailed description can be briefly described as follows.

DETAILED DESCRIPTION

Figure 1:
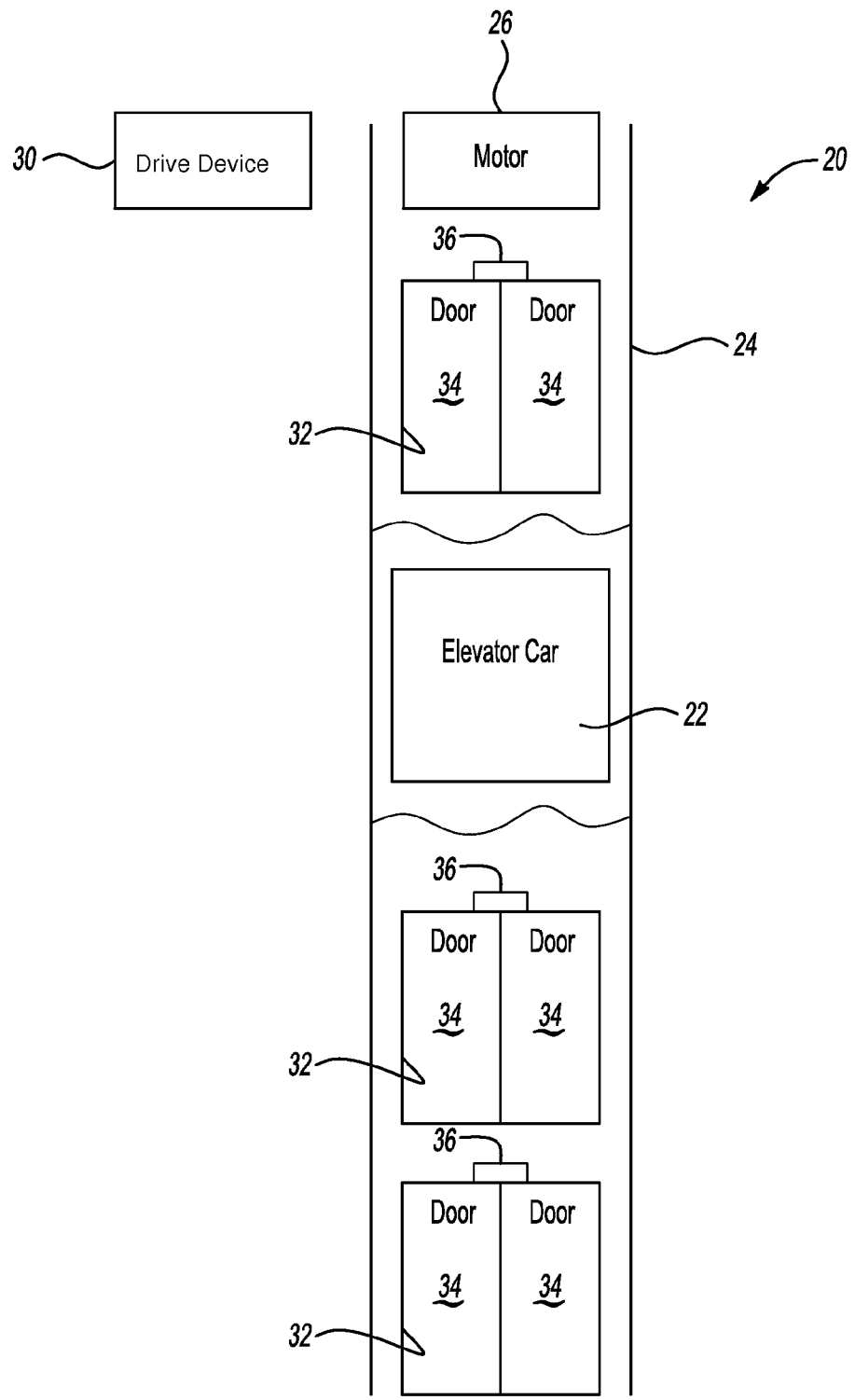
FIG. 1 schematically illustrates an elevator system designed according to an embodiment of this invention.

FIG. 1 schematically shows an elevator system 20. An elevator car 22 is supported in a known manner within a hoistway 24. A motor 26 causes desired movement of the elevator car 22 within the hoistway 24. A drive device 30 controls operation of the motor 26. The drive device 30 includes known components and uses known techniques to control operation of the motor 26 to control movement of the elevator car 22.

The hoistway 24 includes a plurality of openings 32 at a corresponding plurality of landings so that passengers can enter or exit the elevator car 22 at a selected landing. Each opening 32 has at least one door 34 for selectively closing the opening. Conventional door position indicators 36 provide an indication when a corresponding door 34 is open. According to elevator codes, the drive device 30 will not cause the elevator car 22 to move when any of the doors 34 is opened. Each time that a door 34 is open, power to the motor 26 is disconnected. There are other known conditions that require that power to the motor 26 be interrupted. For example, there are known safety chain inputs that provide an indication to turn off power to the motor 26.

Figure 2:
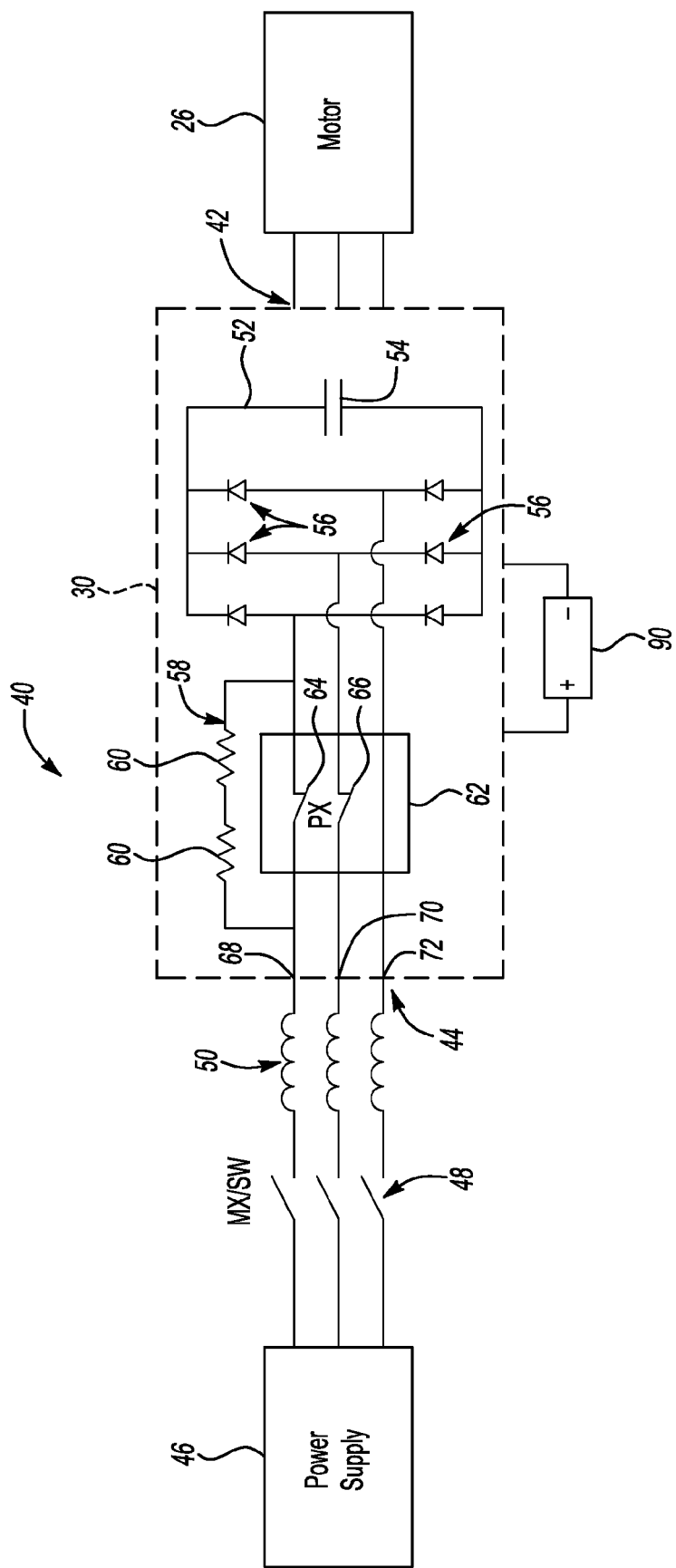
FIG. 2 schematically illustrates a power supply assembly designed according to an embodiment of this invention.

FIG. 2 schematically shows a power control assembly 40 that is used to control power supply to the motor 26. The illustrated example includes a unique arrangement for controlling when power can be supplied to the motor 26 from an output side 42 of the drive device 30. Conventional elevator systems include a switching arrangement (not shown) as described above at the output side 42 between the drive device 30 and the motor 26 for interrupting power supply to the motor whenever a hoistway door 34 is open. The illustrated example eliminates any requirement for such a switch at the output side 42.

The drive device 30 has an input side 44 that is configured to receive power from a power supply 46. A switch 48 selectively connects the drive device 30 to the power supply 46. In previous elevator systems, a switch on the input side 44 of the drive device 30 would be used as a main disconnect between the drive device 30 and the power supply 46. The illustrated example uses the switch 48 for controlling power supply to the motor 26 responsive to an indication from a safety device. Whenever a condition exists that requires disconnecting the motor 26 from power, the switch 48 opens. For example, when any of the door position indicators 36 provides an indication that a door 34 is open the switch 48 disconnects the power supply 46. The switch 48 is also useable as a main disconnect from the power supply 46.

The input side 44 has an associated inductance 50. A DC bus 52 is associated with the drive device 30. The DC bus 52 in this example has an associated capacitor 54 that is a high voltage, high current capacitor to allow for significantly large current amplitudes to be introduced to the front end of the drive device 30 for a short pulse duration. The illustrated drive components 56 (shown as diodes but may comprise IGBTs) also have high current capabilities. Only selected components of the drive device 30 are illustrated. Those skilled in the art will realize what other components to include in an elevator drive device 30.

One aspect of the illustrated example is that each time that the switch 48 disconnects the power supply 46 from the drive device 30 it becomes necessary to recharge the DC bus 52 at a power on time when the switch 48 connects the drive device 30 to the power supply 46. Using the switch 48 at the input side 44 consistent with the manner in which it is used in this example involves turning off the power to the motor 26 each time that the elevator car 22 stops at a landing and the doors are opened or at any other time that any other device associated with the safety chain indicates that power to the motor 26 must be turned off. Given that the switch 48 is on the input side 44, the entire drive device 30 is disconnected from the power supply 46. This presents the unique challenge of having to rapidly charge the DC bus 52 at the power on time so that there is no undesirable delay before the elevator car 22 moves again after the doors are closed (or the other safety chain condition is resolved).

The illustrated example includes a unique arrangement of components to minimize any negative effects from an inrush of current at the power on time and to minimize any delay that would be associated with the need to charge the DC bus 52. The power control assembly 40 controls the input of current to the drive device 30 at the power on time. A restrictive circuit portion 58 is associated with the input side 44 of the drive device 30. In this example, the restrictive circuit portion 58 comprises a resistive element 60. One example resistive element 60 comprises a thermistor. Another example resistive element 60 comprises a resistor. A thermistor may provide the advantage of being able to absorb a large amount of energy at the power on time while keeping costs within desired limits. A resistor may be considered undesirably expensive if it is required to be rated for a large amount of incoming energy.

The restrictive circuit portion 58 has a primary function of dampening the resonance effect (i.e., the LC resonant pulse) of the inductance 50. The resistance of the restrictive circuit portion 50 is selected to be low enough that it does not have a significant impact on the inrush of current to the DC bus 52 at the power on time. Instead, the impedance of the inductance 50 has the primary current-limiting effect when the DC bus 52 is charging at the power on time. This is unique compared to an arrangement in which the resistance is selected as the current-limiting factor. Instead, in this example, the resistance is selected to provide a desired dampening factor for dampening the resonance of the inductance 50. The illustrated example allows the DC bus 52 (i.e., the bus capacitor) to charge rapidly enough to satisfy a desire to be able to quickly move the elevator after the power on time and protects the drive device 30 against a large inrush of current and protects the DC bus 52 against an over-voltage condition when the DC bus 52 is charging.

The circuitry at the input side 44 can be characterized as an RLC circuit, which has characteristics described by the equations: $\omega_n$=SQRT (1/LC) and d=(R/2)*(SQRT(C/L)). In this example, $\omega_n$ is the natural frequency and d is the dampening factor of the resistive circuit portion 58.

This example includes selecting at least the values of C and R to achieve a desired dampening effect to prevent the resonance of the inductance 50 from providing too much current to the DC bus 52 so that an over-voltage condition would result. If left undamped, the result may be that the DC bus voltage is twice as high as desired. The component values are selected in one example as follows.

The value of L typically scales with the power rating of the drive device 30. Larger drives will have lower values of inductance L.

The value of the capacitance C of the DC bus 52 is selected such that $\omega_n \geq 1000$ rad/s (i.e., the natural frequency is $\geq 160$ Hz). This allows the DC bus 52 to charge rapidly. In one example, the DC bus 52 is fully charged within approximately 100 ms. It is desirable to be able to charge the DC bus 52 within about 10 ms. A charge time between about 10 ms and 100 ms is acceptable in the illustrated example.

This charge time is significantly lower than previous arrangements that controlled power to a drive device when it was connected to a power source. Charge time in those arrangements would typically be on the order of at least several seconds. Those arrangements did not have to provide such a rapid response time because they were not used responsive to a safety chain indication to turn off power to the motor. Instead, those arrangements disconnected the motor from the drive device as described above.

The resistance R of the resistive circuit portion 58 is chosen such that the dampening factor d is between 0.7 and 5. One example maintains the dampening factor d in the range between 1 and 2. A value of R that provides a value of d that is less than 0.7 results in a significant overshoot of the DC bus voltage during bus charging. A value of R that provides a value of d that is greater than 5 results in a significant increase in the length of time required for charging the bus. This latter condition exists in the typical elevator drive design in which the bus capacitor is large.

In the illustrated example, the DC bus capacitance charges quickly so that the inductance 50 provides impedance to limit current during charging while the resistance of the resistive circuit portion 80 has minimal effect on limiting current during charging. The inductance 50 introduces the LC resonance that could cause an overvoltage condition on the DC bus 52 so the resistive circuit portion provides the damping effect to dampen the resonance effect of the inductance 50. This combination of component values provides the ability to rapidly charge the DC bus 52 while using the switch 48 on the input side 44 for turning off power to the motor responsive to a safety chain indication.

The illustrated example includes a control 62 for selectively causing current to flow through the resistive element 60 at the power on time. In this example, the control 62 operates as a relay having switches 64 and 66 that are opened when it is desirable to cause current to flow through the resistive element 60 before reaching the drive device 30. The switch 64 is associated with a first input terminal 68 and the switch 66 is associated with a second input terminal 70. A third input terminal 72 does not have an associated switch in this example.

The control 62 opens the switches 64 and 66 at the power on time when the switch 48 connects the power supply 46 to the drive device 30. The switches 64 and 66 remain open so that the resistive element 60 provides the desired damping effect while the DC bus 52 is charging. This protects against an overvoltage condition at the power on time by preventing a voltage over a desired amount on the DC bus 52 and protects the drive device 30 from the inrush of current at the power on time. The resistive element 60 allows the inductance 50 of the input side 44 to be part of a precharging circuit for quickly charging the capacitor 54 and the DC bus 52, which reduces any delay associated with charging the DC bus 52 before the next elevator run can begin.

Once a selected condition of the drive device 30 is achieved, the relay switches 64 and 66 close so that the resistive element 60 is bypassed and no more current flows through it. Rather, current can now flow directly to the drive device 30. In the illustrated example, the control 62 closes the switches 64 and 66 responsive to the DC bus 50 becoming fully charged. The switches 64 and 66 remain closed until the next time that the switch 48 disconnects the power supply 46.

The illustrated example includes a supplemental power source 90 for some of the drive device electronics while the drive device 30 is disconnected from the power supply 46.

The illustrated example eliminates a set of switch contacts between the drive device 30 and the motor 26 compared to previous elevator system designs and, therefore, provides space and cost savings. The disclosed example also simplifies the design of the power control assembly and allows for more flexibility in situating the drive device 30 and the motor 26 relative to each other.

The preceding description is exemplary rather than limiting in nature. Variations and modifications to the disclosed examples may become apparent to those skilled in the art that do not necessarily depart from the essence of this invention.

The scope of legal protection given to this invention can only be determined by studying the following claims.

We claim:

1. A power supply assembly, comprising:
    a drive device having an input side and an output side for providing power to a motor of an elevator system, the drive device including a bus capacitor;
    a switch associated with the input side of the drive device for selectively connecting the input side of the drive device to a power supply to provide power to the motor and selectively disconnecting the motor and the drive device from the power supply based on an elevator system condition that requires that power to the motor be interrupted;
    an inductor having an impedance that limits an amount of current supplied to the bus capacitor during an initial charging of the bus capacitor when the switch connects the input side of the drive device to the power supply; and
    a restrictive circuit portion associated with the input side for dampening a resonance effect of the inductor, the restrictive circuit portion having a resistance that allows the bus capacitor to charge quickly, the impedance of the inductor having a more significant effect on how quickly the bus capacitor charges than an effect of the resistance, a dampening factor of the restrictive circuit being based on a relationship between a capacitance of the bus capacitor, an inductance of the inductor and the resistance such that the dampening factor controls a voltage of the bus capacitor during the charging of the bus capacitor.

2. The assembly of claim 1, wherein the resistance allows the bus capacitor to charge within about 100 milliseconds.

3. The assembly of claim 1, wherein the resistance allows the bus capacitor to charge within about 10 milliseconds.

4. The assembly of claim 1, wherein the capacitance has a value that provides a natural frequency of the assembly that is greater than 160 Hz, the natural frequency being based on a relationship between the capacitance and the inductance.

5. The assembly of claim 1, wherein resistance is selected to establish the dampening factor between 0.7 and 5.

6. The assembly of claim 5, wherein the dampening factor is between 1 and 2.

7. The assembly of claim 1, wherein the dampening factor (d) is defined by the relationship between the capacitance (C) of the bus capacitor, the inductance (L) and the resistance (R) described by the equation $$d=(R/2)*(SQRT(C/L)).$$

8. The assembly of claim 1, wherein the restrictive circuit portion is bypassed so that no current flows through the restrictive circuit portion after a selected condition of the elevator drive device is satisfied and the input side is connected to the power supply.

9. The assembly of claim 8, wherein the selected condition comprises the bus capacitor being fully charged.

10. The assembly of claim 1, wherein the restrictive circuit portion comprises a resistor.

11. The assembly of claim 1, wherein the restrictive circuit portion comprises a thermistor.

12. The assembly of claim 1, wherein the restrictive circuit portion is configured to prevent a voltage over a desired amount from being provided to the drive device when the switch connects the drive device to the power source.

13. The assembly of claim 1, comprising
    a control associated with the restrictive circuit portion for controlling whether current flows through the restrictive circuit portion.

14. The assembly of claim 1, wherein the input side comprises three input terminals, the restrictive circuit portion is associated with a first one of the input terminals for absorbing energy on the first input terminal while the bus capacitor is charging, a second one of the input terminals having on open circuit configuration when the bus capacitor is charging, and a third one of the input terminals being uninterrupted when the bus capacitor is charging.

15. The assembly of claim 1, wherein the elevator system condition comprises a door being open.

16. A method of controlling power supply to a motor of an elevator system, comprising the steps of:
    selectively connecting an input side of a drive device to a power supply for providing power to the motor through an output side of the drive device;
    selectively disconnecting the motor and the drive device from the power supply based on an elevator system condition that requires that power to the motor be interrupted;
    charging a bus capacitor of the drive device during a power on time when the drive device is connected to the power supply;
    restricting a flow of current at the input side of the drive device using an impedance of an inductor during the power on time; and
    dampening a resonance effect of the inductor using a restrictive circuit portion having a resistance that allows the bus capacitor to charge quickly, the impedance of the inductor having a more significant effect on how quickly the bus capacitor charges than an effect of the resistance, a dampening factor of the restrictive circuit being based on a relationship between a capacitance of the bus capacitor, an inductance of the inductor and the resistance such that the dampening factor controls a voltage of the bus capacitor during the charging of the bus capacitor.

17. The method of claim 16, comprising fully charging the bus capacitor within about 100 milliseconds.

18. The method of claim 16, comprising fully charging the bus capacitor within about 10 milliseconds.

19. The method of claim 16, wherein the capacitance has a value that provides a natural frequency of the assembly that is greater than 160 Hz, the natural frequency being based on a relationship between the capacitance and the inductance.

20. The method of claim 16, wherein resistance is selected to establish the dampening factor between 0.7 and 5.

21. The method of claim 20, wherein the dampening factor is between 1 and 2.

22. The method of claim 16, wherein the elevator system condition comprises a door being open.

* * * * *